(12) United States Patent
Kaushikkar et al.

(10) Patent No.: US 10,678,691 B2
(45) Date of Patent: Jun. 9, 2020

(54) COHERENCE FLOWS FOR DUAL-PROCESSING PIPELINES

(71) Applicant: Apple Inc., Cupertino, CA (US)

(72) Inventors: Harshavardhan Kaushikkar, San Jose, CA (US); Srinivasa Rangan Sridharan, San Jose, CA (US); Xiaoming Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/124,713

(22) Filed: Sep. 7, 2018

(65) Prior Publication Data

US 2020/0081840 A1 Mar. 12, 2020

(51) Int. Cl.
*G06F 12/0855* (2016.01)

(52) U.S. Cl.
CPC .. *G06F 12/0855* (2013.01); *G06F 2212/1024* (2013.01)

(58) Field of Classification Search
CPC .................... G06F 12/0855; G06F 12/0846
See application file for complete search history.

(56) References Cited

U.S. PATENT DOCUMENTS

| 10,102,130 B2 | 10/2018 | Guthrie et al. | |
| 10,169,103 B2 | 1/2019 | Guthrie et al. | |
| 10,346,164 B2 | 7/2019 | Arimilli et al. | |
| 10,579,524 B1 | 3/2020 | Mattina et al. | |
| 2014/0173342 A1* | 6/2014 | Kaushikkar | G06F 11/273 714/30 |
| 2014/0281190 A1* | 9/2014 | Kaushikkar | G06F 9/4411 711/105 |
| 2015/0143044 A1* | 5/2015 | Gulati | G06F 12/084 711/121 |
| 2019/0102311 A1* | 4/2019 | Gupta | G06F 12/0884 |

* cited by examiner

*Primary Examiner* — Sean D Rossiter
(74) *Attorney, Agent, or Firm* — Kowert Hood Munyon Rankin and Goetzel PC; Rory D. Rankin (57) ABSTRACT

Systems, apparatuses, and methods for implementing coherence flows for dual-processing coherence and memory cache pipelines are disclosed. A dual-processing pipeline includes a coherence processing pipeline and a memory cache processing pipeline. When a transaction is issued to the dual-processing pipeline, the coherence processing pipeline performs a duplicate tag lookup in parallel with the memory cache processing pipeline performing a memory cache tag lookup for the transaction. If the duplicate tag lookup is a hit, then the coherence processing pipeline locks the matching entry, the memory cache processing pipeline discards the original transaction, and a copyback request is sent to a coherent agent identified by the matching entry. When the copyback response is received by a communication fabric, the copyback response is issued to the memory cache processing pipeline. When the copyback response passes the global ordering point, the coherence processing pipeline clears the lock on the matching entry.

20 Claims, 8 Drawing Sheets

FIG. 8

COHERENCE FLOWS FOR DUAL-PROCESSING PIPELINES

BACKGROUND

Technical Field

Embodiments described herein relate to computing systems, and more particularly, processing memory transactions.

Description of the Related Art

Integrated circuits (ICs) often include multiple circuits or agents that have a need to communicate with each other and/or access data stored in memory. In many cases, agents may communicate through various addresses defined in a common memory map or address space. In multiprocessor ICs, and even in single processor ICs in which other devices access main memory but do not access a given cache, the issue of cache coherence arises. That is, a given data producer can write a copy of data in the cache, and the update to main memory's copy is delayed. In write-through caches, a write operation is dispatched to memory in response to the write to the cache line, but the write is delayed in time. In a writeback cache, writes are made in the cache and not reflected in memory until the updated cache block is replaced in the cache (and is written back to main memory in response to the replacement). Because the updates have not been made to main memory at the time the cache updates are made, a given data consumer can read the copy of data in main memory and obtain "stale" data (data that has not yet been updated). A cached copy in a cache other than the one to which a data producer is coupled can also have stale data. Additionally, if multiple data producers are writing the same memory locations, different data consumers could observe the writes in different orders.

Cache coherence solves these problems by ensuring that various copies of the same data (from the same memory location) can be maintained while avoiding "stale data", and by establishing a "global" order of reads/writes to the memory locations by different producers/consumers. If a read follows a write in the global order, the data read reflects the write. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state in which the cache is responsible for providing the data for a request (either by writing back to main memory before the data is provided to the requestor, or by directly providing the data to the requester), but there may be other copies in other caches. Maintaining cache coherence is increasingly challenging as different agents are accessing the same regions of memory.

In addition to including logic for performing cache coherence operations, computing systems also include communication fabrics for routing transactions to and from memory. Many communication fabrics use a system of interconnected fabric units to arbitrate, aggregate, and/or route packets of messages between different processing elements. For example, some fabrics may use a hierarchical tree structure and process messages at each level in the tree. The processing performed at each level may include arbitration among packets from different processing elements, aggregating of packets belonging to the same message, operations to maintain memory coherence, etc. Communications fabrics are often used in system-on-a-chip (SoC) designs that are found in mobile devices such as cellular phones, wearable devices, etc., where power consumption and performance are important design considerations.

SUMMARY

Systems, apparatuses, and methods for implementing coherence flows for dual-processing coherence and memory cache pipelines are contemplated.

In one embodiment, a system includes a communication fabric and one or more dual-processing pipelines. Each dual-processing pipeline includes a coherence processing pipeline and a memory cache processing pipeline. The communication fabric forwards a transaction to a given dual-processing pipeline, and the given dual-processing pipeline performs a duplicate tag lookup in parallel with a memory cache tag lookup for the transaction.

If the duplicate tag lookup is a hit, then a copyback flow process is implemented. In one embodiment, the copyback flow process involves having the coherence processing pipeline lock the matching entry, the memory cache processing pipeline discarding the original transaction, and a copyback request being sent to a given coherent agent identified by the matching entry. When at a later point in time the copyback response, generated by the given coherent agent, is received by the communication fabric, the copyback response is issued to the memory cache processing pipeline. When the copyback response passes the global ordering point, the coherence processing pipeline clears the lock on the matching entry.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a communication fabric . . . ." Such a claim does not foreclose the system from including additional components (e.g., a processor, a display, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

As used herein, a "memory transaction" or simply "transaction" refers to a command or request to read, write, or modify content (e.g., data or instructions) stored in a memory location corresponding to a particular address. In various embodiments, the address may be provided as a logical address, a physical address, or either. It is noted that throughout this disclosure, transactions may also be referred to as "memory requests", "memory access operations", or "memory operations", which are a type of instruction operation. In various embodiments, memory operations may be implicitly specified by an instruction having a memory operation, or may be derived from explicit load/store instructions.

As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Figure 1:
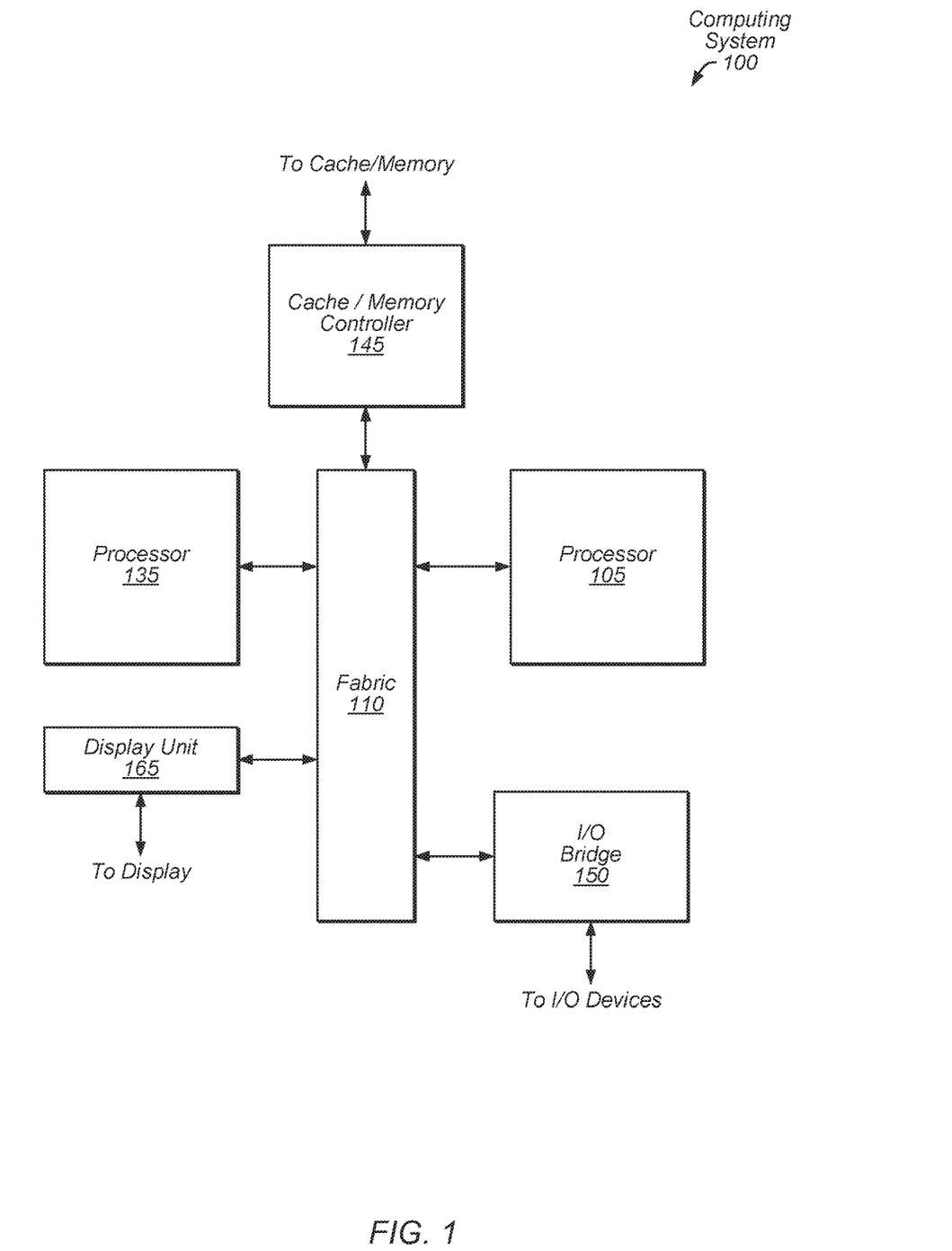
FIG. 1 is a block diagram illustrating one embodiment of a computing system.

Referring now to FIG. 1, a block diagram illustrating one embodiment of a computing system 100. In some embodiments, some or all elements of the computing system 100 may be included within an integrated circuit (IC) or a system on a chip (SoC). In some embodiments, computing system 100 may be included in a mobile device. In the illustrated embodiment, the computing system 100 includes fabric 110, processors 105 and 135, input/output (I/O) bridge 150, cache/memory controller 145, and display unit 165.

Fabric 110 may include various interconnects, buses, MUXes, controllers, etc., and may be configured to facilitate communication between various elements of computing system 100. In some embodiments, portions of fabric 110 may be configured to implement various different communication protocols. In other embodiments, fabric 110 may implement a single communication protocol and elements coupled to fabric 110 may convert from the single communication protocol to other communication protocols internally.

Depending on the embodiment, each of processors 105 and 135 may include various numbers of cores and/or caches. For example, processors 105 and 135 may include 1, 2, or 4 processor cores, or any other suitable number. In some embodiments, processors 105 and 135 may include internal instruction and/or data caches. Processors 105 and 135 are coupled to fabric 110, and processors 105 and 135 may access system memory via cache/memory controller 145. In one embodiment, processor 105 and 135 are coherent agents of system 100. In some embodiments, a coherence unit (not shown) in fabric 110 or elsewhere in computing system 100 may be configured to maintain coherence between various caches of computing system 100. Processors 105 and 135 are configured to execute instructions of a particular instruction set architecture (ISA), which may include operating system instructions and user application instructions.

Cache/memory controller 145 may be configured to manage transfer of data between fabric 110 and one or more caches and/or memories (e.g., non-transitory computer readable mediums). For example, cache/memory controller 145 may be coupled to an L3 cache, which may, in turn, be coupled to a system memory. In other embodiments, cache/memory controller 145 may be directly coupled to a memory. In some embodiments, the cache/memory controller 145 may include one or more internal caches.

Display unit 165 may be configured to read data from a frame buffer and provide a stream of pixel values for display. Display unit 165 may be configured as a display pipeline in some embodiments. Furthermore, display unit 165 may include one or more interfaces (e.g., MIPI® or embedded display port (eDP)) for coupling to a user display (e.g., a touchscreen or an external display). I/O bridge 150 may include various elements configured to implement universal serial bus (USB) communications, security, audio, low-power always-on functionality, and/or other functions. I/O bridge 150 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 100 via I/O bridge 150. In some embodiments, central processing unit 105 may be coupled to computing system 100 via I/O bridge 150.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
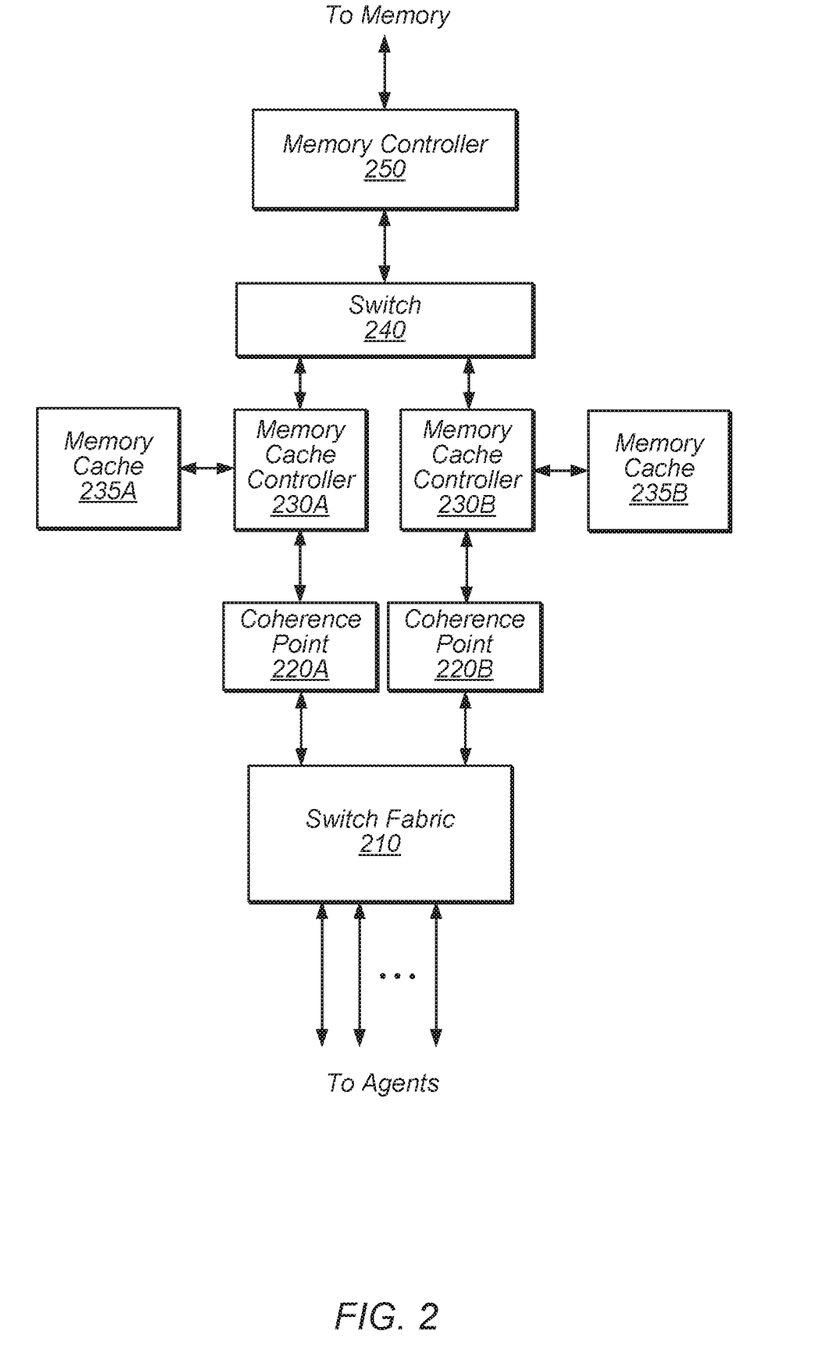
FIG. 2 is a block diagram of one embodiment of a fabric path to memory.

Turning now to FIG. 2, a block diagram of one embodiment of a fabric path to memory is shown. In one embodiment, the fabric path to memory is part of a computing system (e.g., computing system 100 of FIG. 1). The computing system has any number of functional units (i.e., agents) which are coupled to switch fabric 210. The number and type of functional units varies according to the embodiment. These functional units generate transactions which are conveyed to switch fabric 210 on any number of input legs. The transactions pass through switch fabric 210 to one of coherence points 220A-B. In one embodiment, the coherence point 220A-B which a transaction is sent to is based on an address targeted by the transaction.

In one embodiment, each of coherence points 220A-B performs various operations so as to maintain memory coherence among various cache and/or memory structures of the overall computing system. As used herein, the term "coherence point" is intended to be construed according to its well-known meaning, which includes a processing element configured to maintain cache coherence between caches and/or memories in a shared memory system. After coherence operations are performed by a given coherence point 220A-B for a transaction, the transaction is conveyed to a corresponding memory cache controller 230A-B. In one embodiment, "coherence operations" are defined as performing lookups of a duplicate tag structure, generating and sending probes to one or more caches in the computer system to determine if the caches have a copy of a block of data and optionally to indicate the state into which the cache should place the block of data, processing responses to probes, and/or one or more other operations.

Some memory transactions may be fulfilled by accessing a main system memory or a storage device. In some computing systems, the amount of time required to read/write data from/to the main system memory or the storage device may be longer than an execution time of several processor instructions. To enable faster access to frequently accessed content, issued memory transactions are sent to a memory cache controller 230A-B which may provide faster fulfillment of the memory transactions by storing content from frequently accessed memory locations in a memory cache 235A-B, respectively, that can be read and written faster than the main system memory or the storage device. After receiving a memory transaction, memory cache controller 230A-B determines if an address included in the memory transaction corresponds to an address currently stored in memory cache 235A-B, respectively. If the corresponding address for the memory transaction is currently stored in memory cache 235A-B, then memory cache controller 230A-B performs the transaction on a cached copy of requested content. Otherwise, if the address included in the memory transaction is not currently stored in the memory cache 235A-B, then memory cache controller 230A-B issues a command to retrieve data at the address included in the memory command. This command is conveyed to switch 240 and then to memory controller 250. Memory controller 250 is representative of any number of memory controllers which are connected to memory device(s) (not shown) via any number of memory channels.

Figure 3:
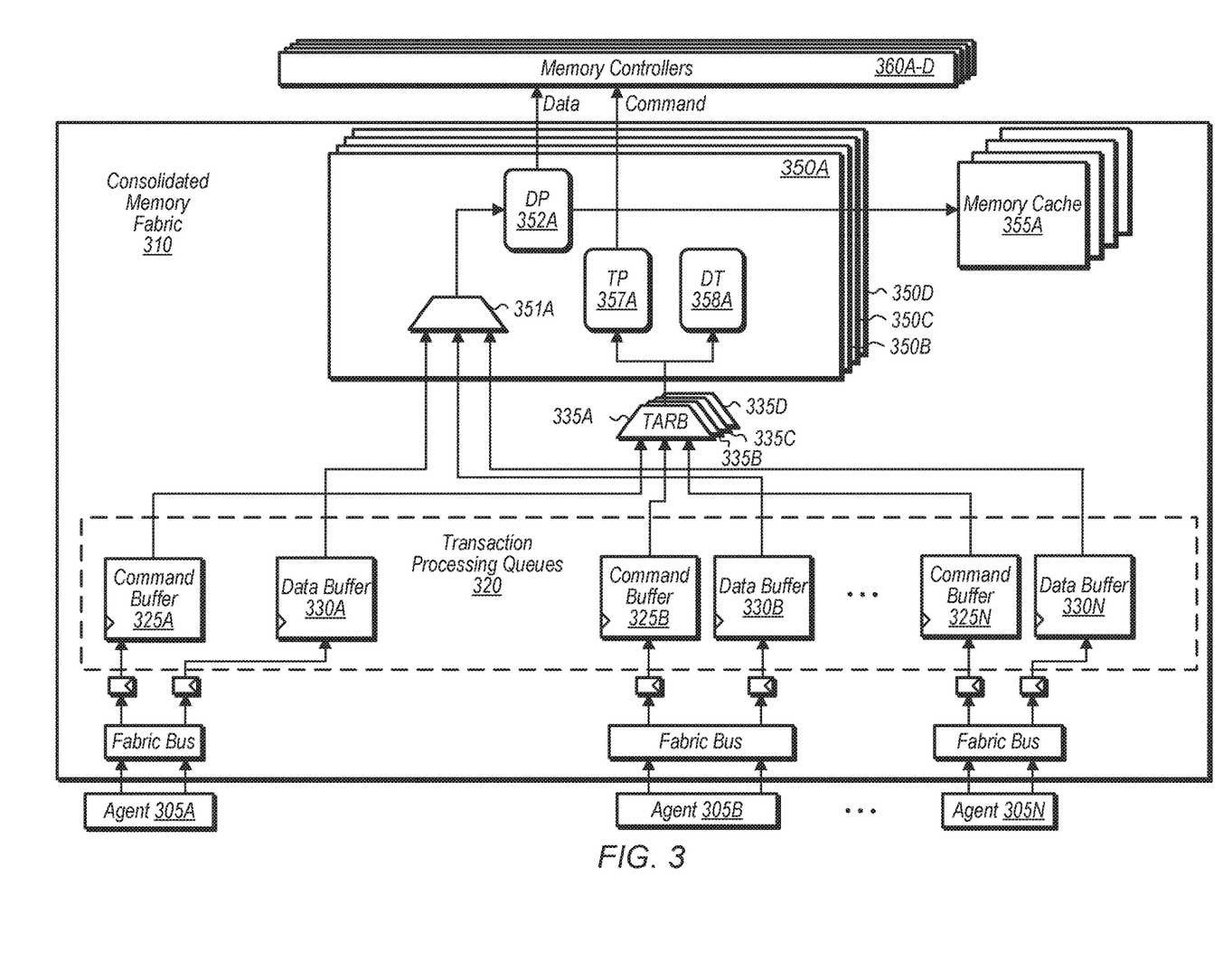
FIG. 3 is a block diagram of one embodiment of a consolidated memory fabric.

Referring now to FIG. 3, a block diagram of one embodiment of a consolidated memory fabric 310 is shown. In one embodiment, consolidated memory fabric 310 includes transaction processing queues 320, tag arbiters 335A-D, combined coherence point and memory cache controller units 350A-D, and memory caches 355A-D. Consolidated memory fabric 310 is coupled to agents 305A and memory controllers 360A-D. In other embodiments, consolidated memory fabric 310 includes other components and/or is arranged in other suitable manners. It is noted that "consolidated memory fabric" 310 may also be referred to as a "communication fabric" herein.

Agents 305A-N are representative of any number and type of agents. For example, in various embodiments, agents 305A-N include a CPU, a GPU, an I/O device, a system management unit, and/or other types of agents. Agents 305A-N send transactions upstream to memory through fabric bus components and flops to transaction processing queues 320. In one embodiment, there is a separate command buffer 325A-N and data buffer 330A-N pair for each agent 305A-N, respectively. In various embodiments, an entry in command buffers 325A-N may include a value representing a memory command, an address or addresses for the command (either logical or physical address), a value representing a priority of the transaction, a value representing an age or length of time since the transaction was issued, and/or any other suitable values that may be used in the processing of the transaction.

In one embodiment, the memory bandwidth of the overall computing system is divided into multiple memory pipelines (i.e., multiple distinct processing paths) such that each has its own memory controller and can be accessed independently of other memories. For example, in one embodiment, each memory and corresponding memory pipeline may be assigned a portion of an address space. Alternatively, a memory and corresponding memory pipeline may be assigned data based on load balancing or other considerations. In one embodiment, the memory pipeline that a transaction traverses is selected based on a hash function applied to at least a portion of the transaction address. In such an embodiment, some form of mapping between memories and address hashes may be maintained. In the embodiment shown in FIG. 3, computing system 300 includes four pipelines 350A-D. However, it should be understood that in other embodiments, computing system 300 may include other numbers of pipelines.

In one embodiment, consolidated memory fabric 310 includes a common arbitration point represented by tag arbiters 335A-D. For each pipeline, a given tag arbiter 335A-D selects a transaction from transaction processing queues 320 to forward to a corresponding combined coherence point and memory cache controller unit 350A-D. It is noted that tag arbiters 335A-D arbitrate across all of the transaction processing queues 320. In other words, tag arbiters 335A-D represent a common arbitration point across all transaction processing queues 320.

Transaction processing queues 320 include any number of queues, with the number varying according to the embodiment. Each transaction processing queue 320 includes a command buffer 325A-N and data buffer 330A-N, respectively, with each buffer including a plurality of entries. As used herein, the term "queue" refers to a storage element having a plurality of entries. Queues are often used to store data (e.g., data associated with transactions) while waiting for processing resources to become available or for particular events to occur. In some embodiments, queues are used to store transactions in program order even though the transactions may be performed out of program order. Thus, queues do not always behave in a first-in-first-out (FIFO) manner. For example, if transactions arrive out of program order but are removed in program order, the transactions may not be dequeued (or retired) in the same order in which they are enqueued. As used herein, the term "storage element" refers to any element configured to store one or more values in a volatile or non-volatile manner. Examples of storage elements include registers, memories, latches, disks, etc.

Tag arbiters 335A-D perform arbitration and then determine which transaction is ready to be sent to combined coherence point and memory cache controller units 350A-D, respectively, for processing. In one embodiment, each combined coherence point and memory cache controller unit 350A-D handles both coherence operations and a memory cache lookup. It is noted that combined coherence point and memory cache controller units 350A-D may also be referred to as combined coherence point and memory cache controller pipelines, dual-processing pipelines, or pipelines for short. In one embodiment, each tag arbiter 335A-D feeds into (i.e., supplies) a single pipeline 350A-D per memory channel. Also, each pipeline 350A-D feeds into a respective memory channel.

In one embodiment, pipeline 350A includes multiplexer 351A, data path 352A, memory cache tag pipeline 357A, and duplicate tag pipeline 358A. It is noted that the terms "duplicate tag pipeline" and "coherence processing pipeline" may be used interchangeably herein. It is also noted that the terms "memory cache tag pipeline" and "memory cache processing pipeline" may be used interchangeably herein. The other combined coherence point and memory cache controller units 350B-D have similar circuitry. Multiplexer 351A feeds data path 352A with data from a corresponding data buffer 330A-N once the pipeline has finished processing the transaction. Memory cache tag pipeline 357A includes circuitry for performing a lookup of the tags of memory cache 355A while duplicate tag pipeline 358A includes circuitry for performing a duplicate tag lookup for coherence purposes. Memory cache 355A stores recently accessed data from memory for a first memory channel, while duplicate tag pipeline 358A include tags, corresponding to the first memory channel, of cache lines stored in other caches of the computing system. In one embodiment, the lookup of memory cache tags is performed in parallel with the lookup of duplicate tag pipeline 358A.

The architecture of consolidated memory fabric 310 is a consolidation, into a single logical block, of the entire hierarchy which was previously present in the switch fabric, coherence point, memory cache controller, and memory controller switch (shown in FIG. 2).

Figure 4:
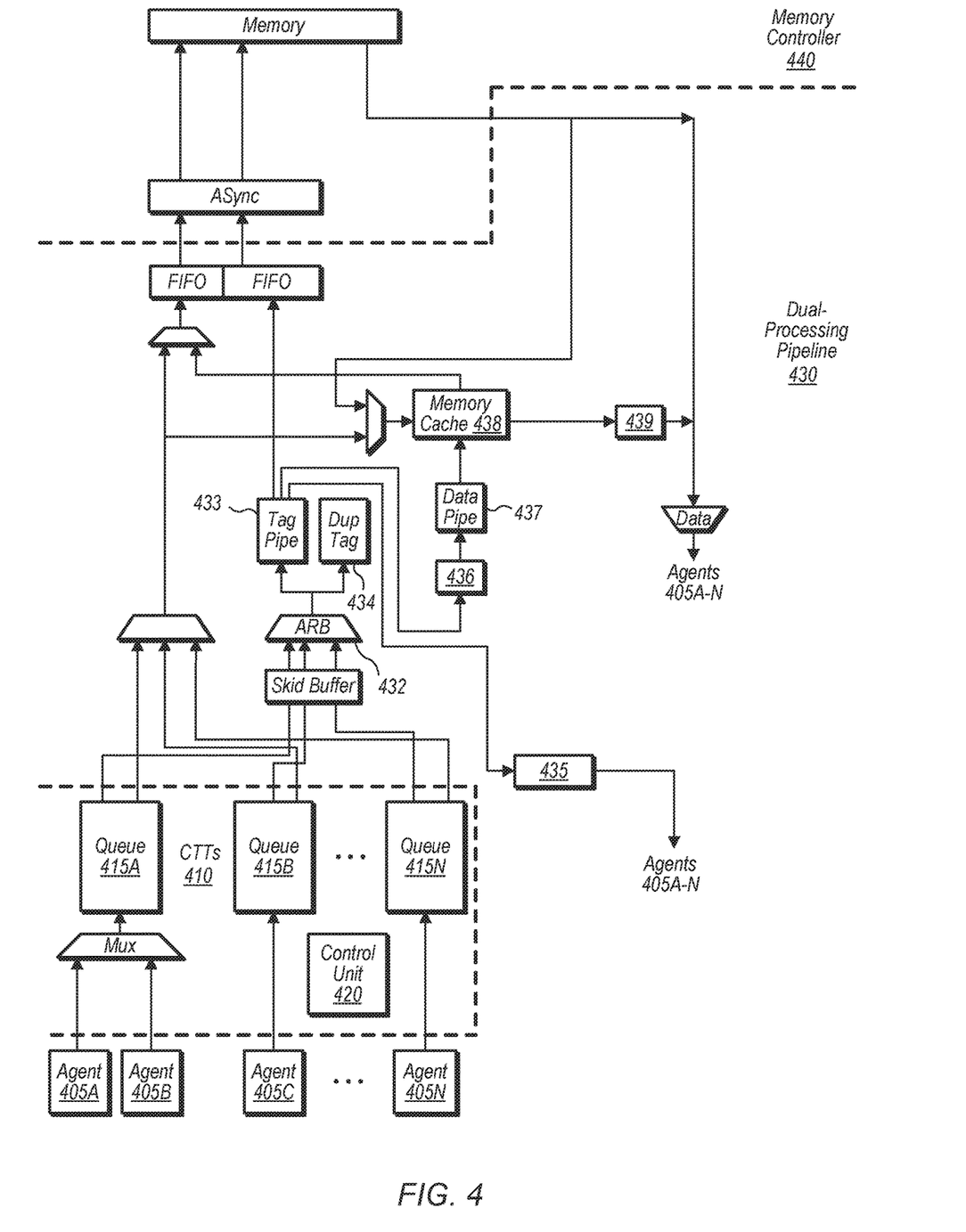
FIG. 4 is a block diagram of another embodiment of a consolidated memory fabric.

Turning now to FIG. 4, a block diagram of another embodiment of a consolidated memory fabric is shown. In one embodiment, one or more of the components shown in the consolidated memory fabric of FIG. 4 are included in consolidated memory fabric 310 (of FIG. 3). As shown in FIG. 4, agents 405A-N are coupled to current transaction tables (CTTs) 410, CTTs 410 are coupled to dual-processing pipeline 430, and dual-processing pipeline 430 is coupled to memory controller 440. In one embodiment, CTTs 410 receive transactions from agents 405A-N on the upstream path to memory. Agents 405A-N are representative of any number and type of agents. CTTs 410 include any number of queues 415A-N for queuing entries corresponding to transactions received from agents 405A-N. CTTs 410 also include control unit 420 for managing the queuing of transactions and generating notifications for other units within the fabric, agents 405A-N, and/or the memory subsystem. It is noted that the terms "control unit" and "control logic" may be used interchangeably herein. Arbiter 432 selects transactions out of queues 415A-N for issuance to memory cache tag pipeline 433 and duplicate tag pipeline 434.

In one embodiment, when a coherent read transaction hits in the duplicate tag pipeline 434, the matching entry in the duplicate tag structure is locked and the coherent read transaction is discarded by memory cache tag pipeline 433. Also, when the coherent read transaction hits in the duplicate tag pipeline 434, a snoop command is generated for the coherent agent which has the latest version of the data targeted by the coherent read transaction. In one embodiment, the snoop command will be stored in queue 435 while the original coherent read transaction remains in its original queue 415. In one embodiment, queue 435 issues a copyback request to the given coherent agent back through the communication fabric. As used herein, a "copyback request" refers to a request for a coherent agent to write one or more cache lines back to memory. In response to receiving the copyback request, the given coherent agent will snoop its cache subsystem and send a copyback response with the targeted data back upstream toward memory.

In one embodiment, the copyback response will be enqueued in the same queue 415 which stores the original coherent read transaction. When arbiter 432 selects the copyback response, the copyback response will be issued to memory cache tag pipeline 433 and a fill response with the data of the copyback response will be stored in queue 435. In one embodiment, a corresponding data pull command is enqueued in queue 436. The data pull command will be processed by data pipeline 437, causing the data to be pulled into data buffer 439 from memory cache 438. A fill response with the data will be sent from queue 435 to the original requestor and a notification, that the fill response has been sent, will be conveyed to the original coherent read transaction. In response to receiving the notification, the original coherent read transaction will clear the locked entry in duplicate tag pipeline 434, and then the original coherent read transaction will be dequeued from its queue 415.

It is noted that the sequence of events described as being performed in response to a hit in duplicate tag pipeline 434 for a coherent read transaction are meant to be exemplary only and are in accordance with one particular embodiment. In other embodiments, this sequence of events may be altered by including one or more other steps, omitting one or more steps, and/or altering the order in which one or more steps are performed.

Figure 5:
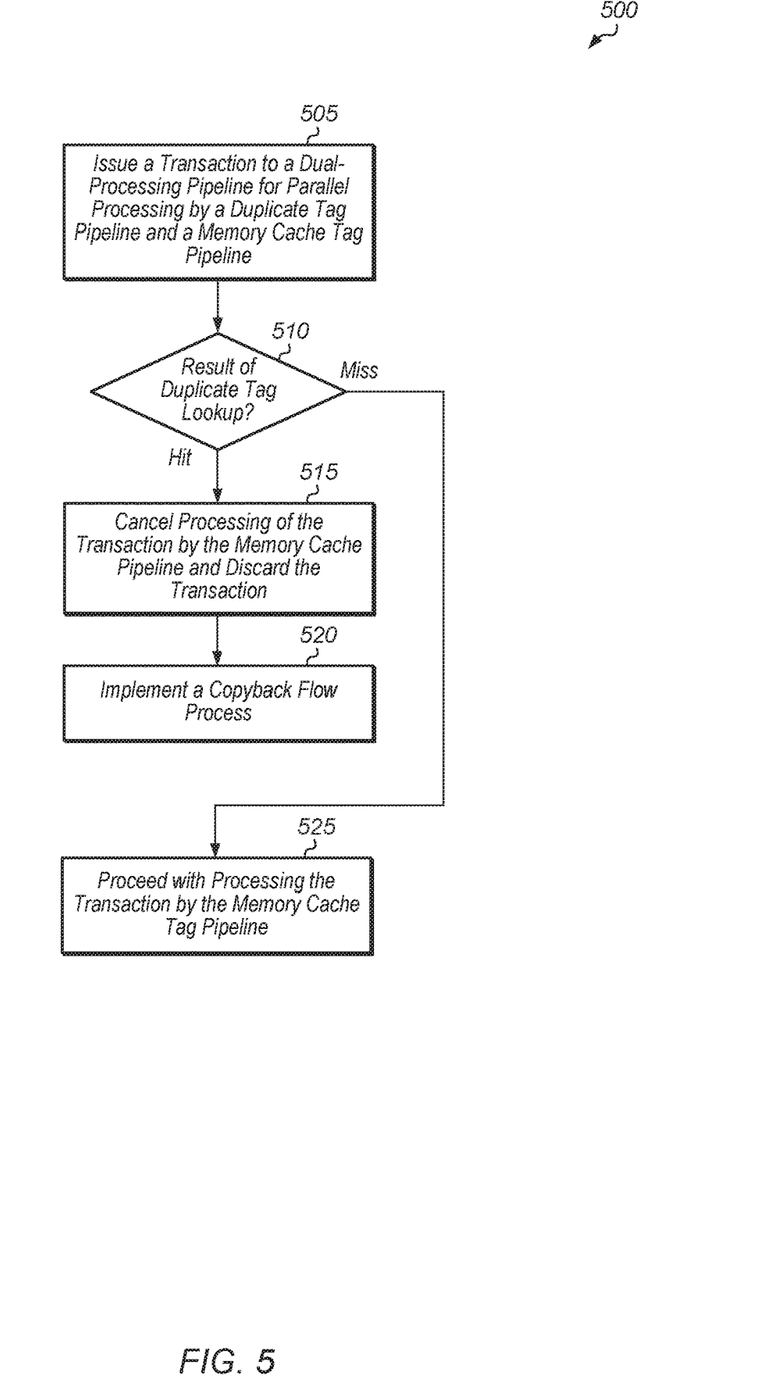
FIG. 5 is a generalized flow diagram illustrating one embodiment of a method for processing a duplicate tag pipeline hit.

Referring now to FIG. 5, one embodiment of a method 500 for processing a duplicate tag pipeline hit is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein or any of various other types of devices may be configured to implement method 500.

A transaction is issued to a dual-processing pipeline for parallel processing by a duplicate tag pipeline and a memory cache tag pipeline (block 505). If the lookup of the transaction results in a hit to a duplicate tag structure (conditional block 510, "hit" leg), then processing of the transaction by the memory cache tag pipeline is cancelled and the transaction is discarded by the memory cache tag pipeline (block 515). Also, in response to the transaction lookup hitting in the duplicate tag pipeline, a copyback flow process is implemented (block 520). One example of a copyback flow process is described in further detail below in the discussion associated with method 600 of FIG. 6. After block 520, method 500 ends. If the transaction misses in the duplicate tag pipeline (conditional block 510, "misses" leg), then processing of the transaction by the memory cache tag pipeline is allowed to proceed (block 525). After block 525, method 500 ends.

Figure 6:
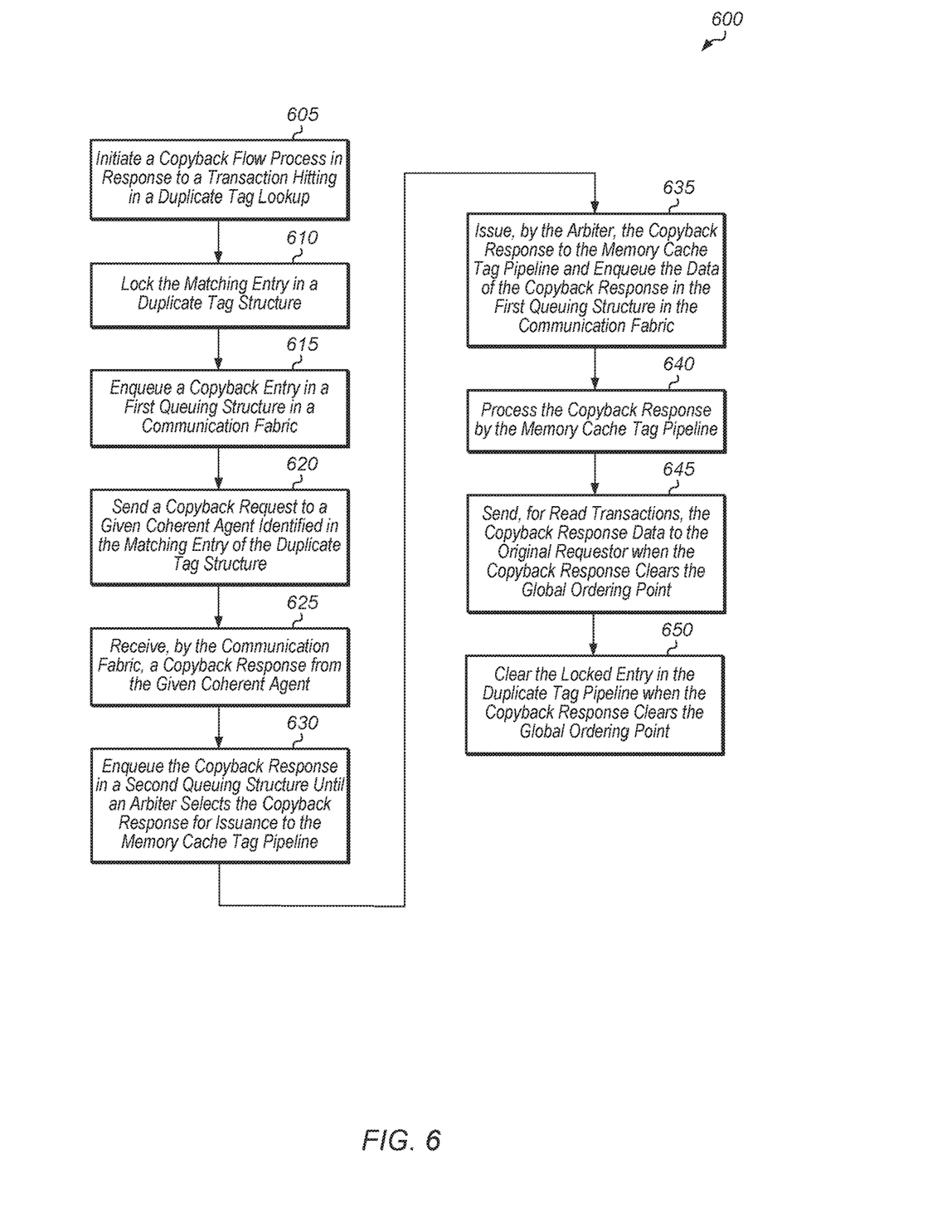
FIG. 6 is a generalized flow diagram illustrating another embodiment of a method for implementing a copyback flow process.

Turning now to FIG. 6, one embodiment of a method 600 for implementing a copyback flow process is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein or any of various other types of devices may be configured to implement method 600.

A copyback flow process is initiated in response to a transaction hitting in a duplicate tag lookup (block 605). Also, the matching entry in a duplicate tag structure is locked in response to the match (block 610). Next, a copyback entry is enqueued in a first queuing structure in a communication fabric (block 615). Then, a copyback request is sent to a given coherent agent identified in the matching entry of the duplicate tag structure (block 620).

At a later point in time, a copyback response from the given coherent agent is received by the communication fabric (block 625). The copyback response is enqueued in a second queuing structure until an arbiter selects the copyback response for issuance to the memory cache tag pipeline (block 630). In one embodiment, the first queuing structure in which the copyback entry is enqueued is different from the second queuing structure in which the original transaction and the copyback response are enqueued. When the arbiter issues the copyback response to the memory cache tag pipeline, the data of the copyback response is enqueued in the first queuing structure in the communication fabric (block 635). Next, the copyback response is processed by the memory cache tag pipeline (block 640). Then, for read transactions, when the copyback response clears the global ordering point, the copyback response data is sent to the original requestor (block 645). As used herein, the "global ordering point" is defined as the point in the memory subsystem beyond which all operations are ordered with respect to each other. In one embodiment, the global ordering point is located at the end of the memory cache tag pipeline. Also, the original transaction clears the locked entry in the duplicate tag pipeline when the copyback response clears the global ordering point (block 650). After block 650, method 600 ends.

Figure 7:
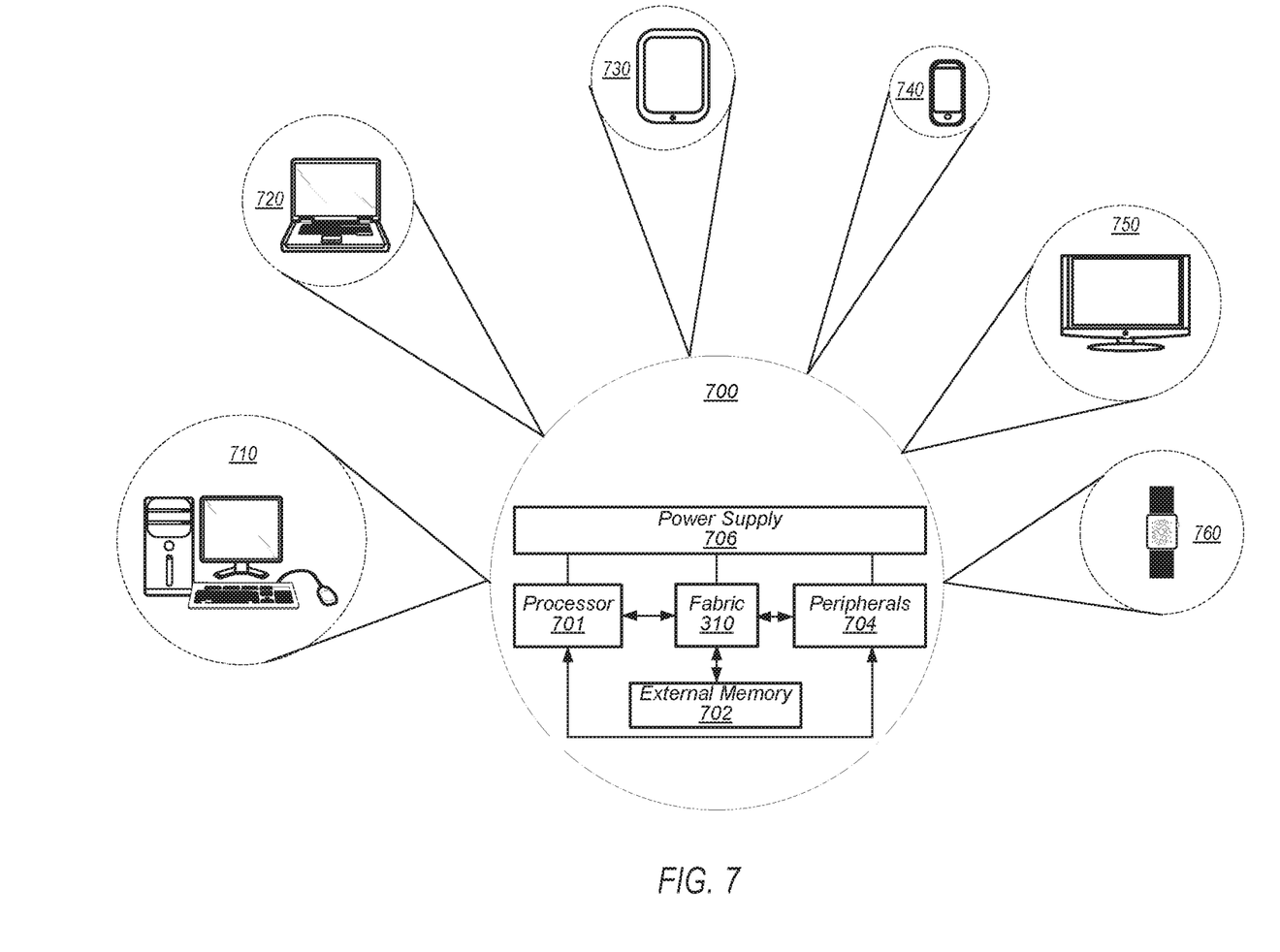
FIG. 7 is a block diagram of one embodiment of a system.

Referring next to FIG. 7, a block diagram of one embodiment of a system 700 is shown. As shown, system 700 may represent chip, circuitry, components, etc., of a desktop computer 710, laptop computer 720, tablet computer 730, cell or mobile phone 740, television 750 (or set top box configured to be coupled to a television), wrist watch or other wearable item 760, or otherwise. Other devices are possible and are contemplated. In the illustrated embodiment, the system 700 includes at least one instance of consolidated memory fabric 310 (of FIG. 3). In various embodiments, fabric 310 may be included within a system on chip (SoC) or integrated circuit (IC) which is coupled to processor 701, external memory 702, peripherals 704, and power supply 706.

Fabric 310 is coupled to processor 701, one or more peripherals 704, and the external memory 702. A power supply 706 is also provided which supplies the supply voltages to fabric 310 as well as one or more supply voltages to the processor 701, memory 702, and/or the peripherals 704. In various embodiments, power supply 706 may represent a battery (e.g., a rechargeable battery in a smart phone, laptop or tablet computer). In some embodiments, more than one instance of fabric 310 may be included (and more than one processor 701 and/or external memory 702 may be included as well).

The memory 702 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an SoC or IC containing fabric 310 in a chip-on-chip configuration, a package-on-package configuration, or a multi-chip module configuration.

The peripherals 704 may include any desired circuitry, depending on the type of system 700. For example, in one embodiment, peripherals 704 may include devices for various types of wireless communication, such as wifi, Bluetooth, cellular, global positioning system, etc. The peripherals 704 may also include additional storage, including RAM storage, solid state storage, or disk storage. The peripherals 704 may include user interface devices such as a display screen, including touch display screens or multi-touch display screens, keyboard or other input devices, microphones, speakers, etc.

Figure 8:
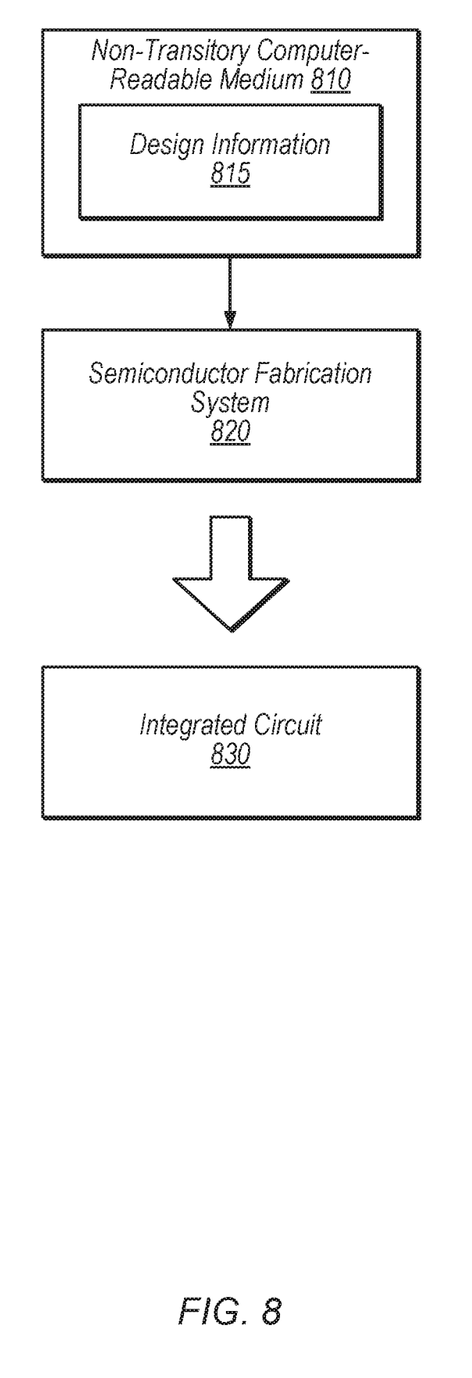
FIG. 8 is a block diagram illustrating an exemplary non-transitory computer-readable storage medium that stores circuit design information.

Turning now to FIG. 8, a block diagram illustrating an exemplary non-transitory computer-readable storage medium that stores circuit design information is shown. In the illustrated embodiment, semiconductor fabrication system 820 is configured to process the design information 815 stored on non-transitory computer-readable medium 810 and fabricate integrated circuit 830 based on the design information 815.

Non-transitory computer-readable medium 810 may comprise any of various appropriate types of memory devices or storage devices. Medium 810 may be an installation medium, (e.g., a CD-ROM, floppy disks, or tape device) a computer system memory or random access memory (e.g., DRAM, DDR RAM, SRAM, EDO RAM, Rambus RAM), a non-volatile memory (e.g., a Flash, magnetic media, a hard drive, optical storage), registers, or other similar types of memory elements. Medium 810 may include other types of non-transitory memory as well or combinations thereof. Medium 810 may include two or more memory mediums which may reside in different locations (e.g., in different computer systems that are connected over a network).

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis and/or layout of integrated circuit 830.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1-4. Furthermore, integrated circuit 830 may be configured to perform various functions described herein in conjunction with other components. For example, integrated circuit 830 may be coupled to voltage supply circuitry that is configured to provide a supply voltage (e.g., as opposed to including a voltage supply itself). Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In various embodiments, program instructions of a software application are used to implement the methods and/or mechanisms described herein. For example, program instructions executable by a general or special purpose processor are contemplated. In various embodiments, such program instructions are represented by a high level programming language. In other embodiments, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of embodiments. Numerous variations and modifications will become apparent to those skilled in the art once the above disclosure is fully appreciated. It is intended that the following claims be interpreted to embrace all such variations and modifications.

What is claimed is:

1. A computing system comprising:
one or more duplicate tag pipelines;
one or more memory cache tag pipelines; and
control logic configured to forward a transaction for parallel processing to a first duplicate tag pipeline and a first memory cache tag pipeline;
wherein responsive to detecting a duplicate tag hit for the transaction, the first duplicate tag pipeline is configured to send, to the first memory cache tag pipeline, a notification of the duplicate tag hit for the transaction; and
wherein the first memory cache tag pipeline is configured to discard the transaction responsive to receiving the notification.

2. The computing system as recited in claim 1, wherein the first duplicate tag pipeline is further configured to lock a matching entry of the first duplicate tag pipeline responsive to detecting the duplicate tag hit for the transaction, wherein the lock of the matching entry causes subsequent transactions which hit the matching entry to stall.

3. The computing system as recited in claim 1, wherein responsive to receiving the notification, the first memory cache tag pipeline is configured to discard the transaction prior to the transaction crossing a global ordering point.

4. The computing system as recited in claim 1, wherein responsive to detecting the duplicate tag hit for the transaction, the control logic is configured to:
enqueue a copyback entry in a first queue;
send a copyback request to a given coherent agent identified in a matching entry of the first duplicate tag pipeline; and
wait for a copyback response from the given coherent agent.

5. The computing system as recited in claim 4, wherein the control logic is further configured to:
receive the copyback response from the given coherent agent via a communication fabric; and
enqueue a copyback response entry in a second queue while waiting for the copyback response to be issued to the first memory cache tag pipeline.

6. The computing system as recited in claim 5, wherein the control unit is further configured to send data of the copyback response to a requesting agent responsive to the first memory cache tag pipeline processing the copyback response and the copyback response crossing a global ordering point.

7. The computing system as recited in claim 6, wherein the first duplicate tag pipeline is configured to clear a lock of the matching entry of the first duplicate tag pipeline responsive to the copyback response crossing the global ordering point.

8. A method comprising:
forwarding, by control logic, a transaction for parallel processing to a duplicate tag pipeline and a memory cache tag pipeline;
detecting, by the duplicate tag pipeline, a duplicate tag hit for the transaction;
sending, by the duplicate tag pipeline to the memory cache tag pipeline, a notification of the duplicate tag hit; and
discarding, by the memory cache tag pipeline, the transaction responsive to receiving the notification.

9. The method as recited in claim 8, further comprising locking a matching entry of the duplicate tag pipeline responsive to detecting the duplicate tag hit for the transaction, wherein the lock of the matching entry causes subsequent transactions which hit the matching entry to stall.

10. The method as recited in claim 8, further comprising discarding, by the memory cache tag pipeline, the transaction prior to the transaction crossing a global ordering point.

11. The method as recited in claim 8, wherein responsive to detecting the duplicate tag hit for the transaction, the method further comprising:
enqueuing a copyback entry in a first queue;
sending a copyback request to a given coherent agent identified in a matching entry of the duplicate tag pipeline; and
waiting for a copyback response from the given coherent agent.

12. The method as recited in claim 11, further comprising:
receiving the copyback response from the given coherent agent via a communication fabric; and
enqueuing a copyback response entry in a second queue while waiting for the copyback response to be issued to the memory cache tag pipeline.

13. The method as recited in claim 12, further comprising send data of the copyback response to a requesting agent responsive to the memory cache tag pipeline processing the copyback response and the copyback response crossing a global ordering point.

14. The method as recited in claim 13, further comprising clearing a lock of the matching entry of the duplicate tag pipeline responsive to the copyback response crossing the global ordering point.

15. An apparatus comprising:
one or more processing units;
one or more dual-processing pipelines; and
control logic configured to:
receive a transaction from a first processing unit; and
forward the transaction for parallel processing to a first dual-processing pipeline, wherein the first dual-processing pipeline comprises a duplicate tag pipeline and a memory cache tag pipeline;
wherein responsive to detecting a duplicate tag hit for the transaction:
send, by the duplicate tag pipeline to the memory cache tag pipeline, a notification of the duplicate tag hit for the transaction; and
discard, by the memory cache tag pipeline, the transaction responsive to receiving the notification.

16. The apparatus as recited in claim 15, wherein the duplicate tag pipeline is further configured to lock a matching entry of the duplicate tag pipeline responsive to detecting the duplicate tag hit for the transaction, wherein the lock of the matching entry causes subsequent transactions which hit the matching entry to stall.

17. The apparatus as recited in claim 15, wherein responsive to receiving the notification, the memory cache tag pipeline is configured to discard the transaction prior to the transaction crossing a global ordering point.

18. The apparatus as recited in claim 15, wherein responsive to detecting a duplicate tag hit for the transaction, the control logic is configured to:
enqueue a copyback entry in a first queue;
send a copyback request to a given coherent agent identified in a matching entry of the duplicate tag pipeline; and
wait for a copyback response from the given coherent agent.

19. The apparatus as recited in claim 18, wherein the control logic is further configured to:
receive the copyback response from the given coherent agent via a communication fabric; and
enqueue a copyback response entry in a second queue while waiting for the copyback response to be issued to the memory cache tag pipeline.

20. The apparatus as recited in claim 19, wherein the control logic is further configured to send data of the copyback response to a requesting agent responsive to the memory cache tag pipeline processing the copyback response and the copyback response crossing a global ordering point.

\* \* \* \* \*